No. 645,926. Patented Mar. 20, 1900.
P. D. BLACKDEN.
BRAKE FOR VEHICLES.
(Application filed July 5, 1899.)

(No Model.) 3 Sheets—Sheet 1.

Witnesses: Inventor:
Perry D. Blackden,
by Crosby & Gregory
attys.

No. 645,926. Patented Mar. 20, 1900.
P. D. BLACKDEN.
BRAKE FOR VEHICLES.
(Application filed July 5, 1899.)

(No Model.) 3 Sheets—Sheet 2.

Witnesses:

Inventor:
Perry D. Blackden,
by Crosby & Gregory
Attys.

No. 645,926. Patented Mar. 20, 1900.
P. D. BLACKDEN.
BRAKE FOR VEHICLES.
(Application filed July 5, 1899.)

(No Model.) 3 Sheets—Sheet 3.

Witnesses:

Inventor:
Perry D. Blackden,

UNITED STATES PATENT OFFICE.

PERRY D. BLACKDEN, OF EVERETT, MASSACHUSETTS.

BRAKE FOR VEHICLES.

SPECIFICATION forming part of Letters Patent No. 645,926, dated March 20, 1900.

Application filed July 5, 1899. Serial No. 722,815. (No model.)

*To all whom it may concern:*

Be it known that I, PERRY D. BLACKDEN, of Everett, county of Middlesex, State of Massachusetts, have invented an Improvement in Brakes, of which the following description, in connection with the accompanying drawings, is a specification, like letters and numerals on the drawings representing like parts.

This invention relates to brakes; and the object of the invention is to provide a simple and effective appliance of this character capable of ready application to different kinds of vehicles—such as automobiles, bicycles, &c.—and the construction is such that the brake will serve to quickly stop the vehicle without the exertion of undue labor on the part of the operator, and the different parts of the brake are inclosed, ordinarily, by a housing, so as to protect them from injury by dust, dirt, &c.

Figure 1:
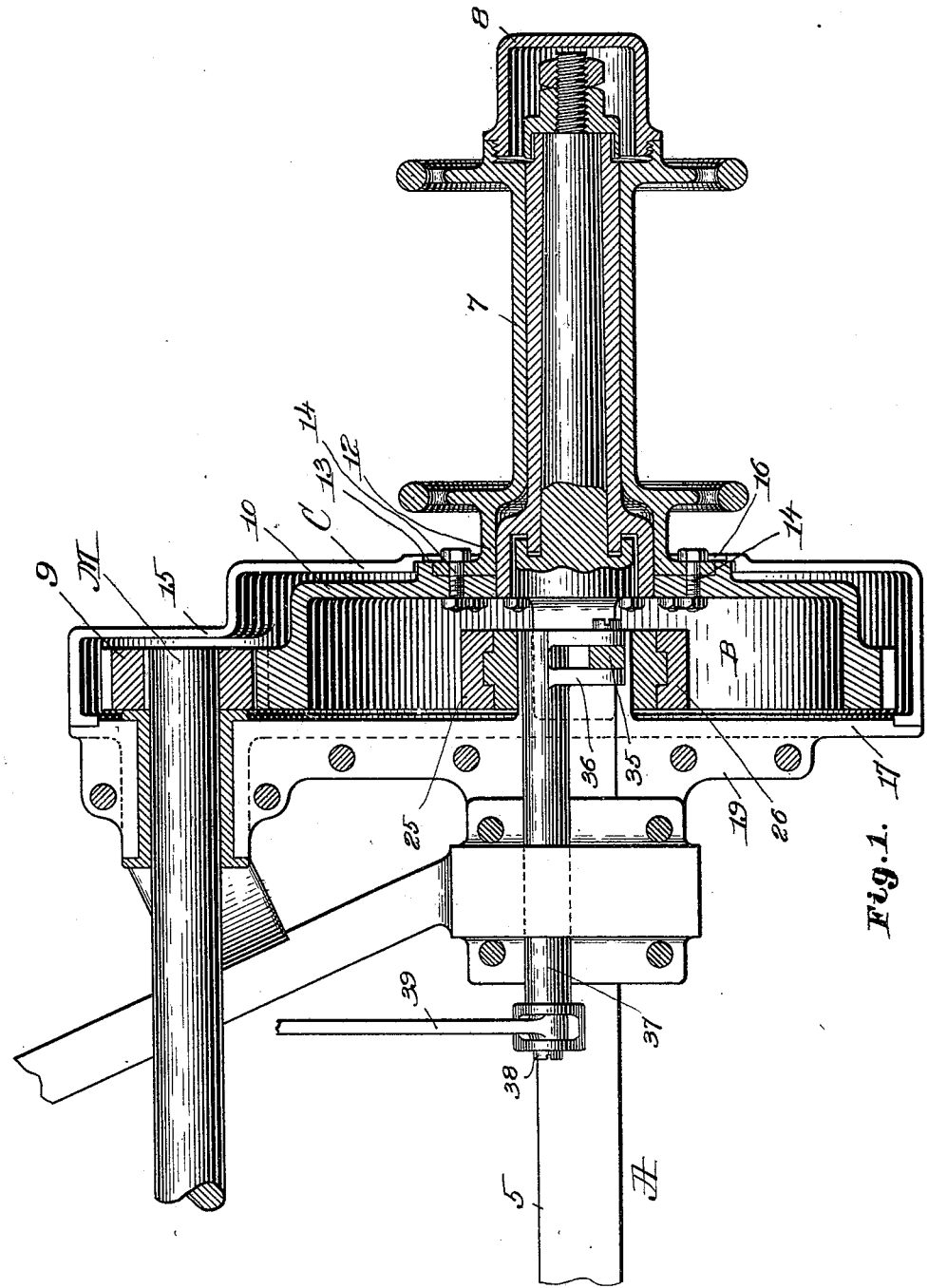
Figure 2:
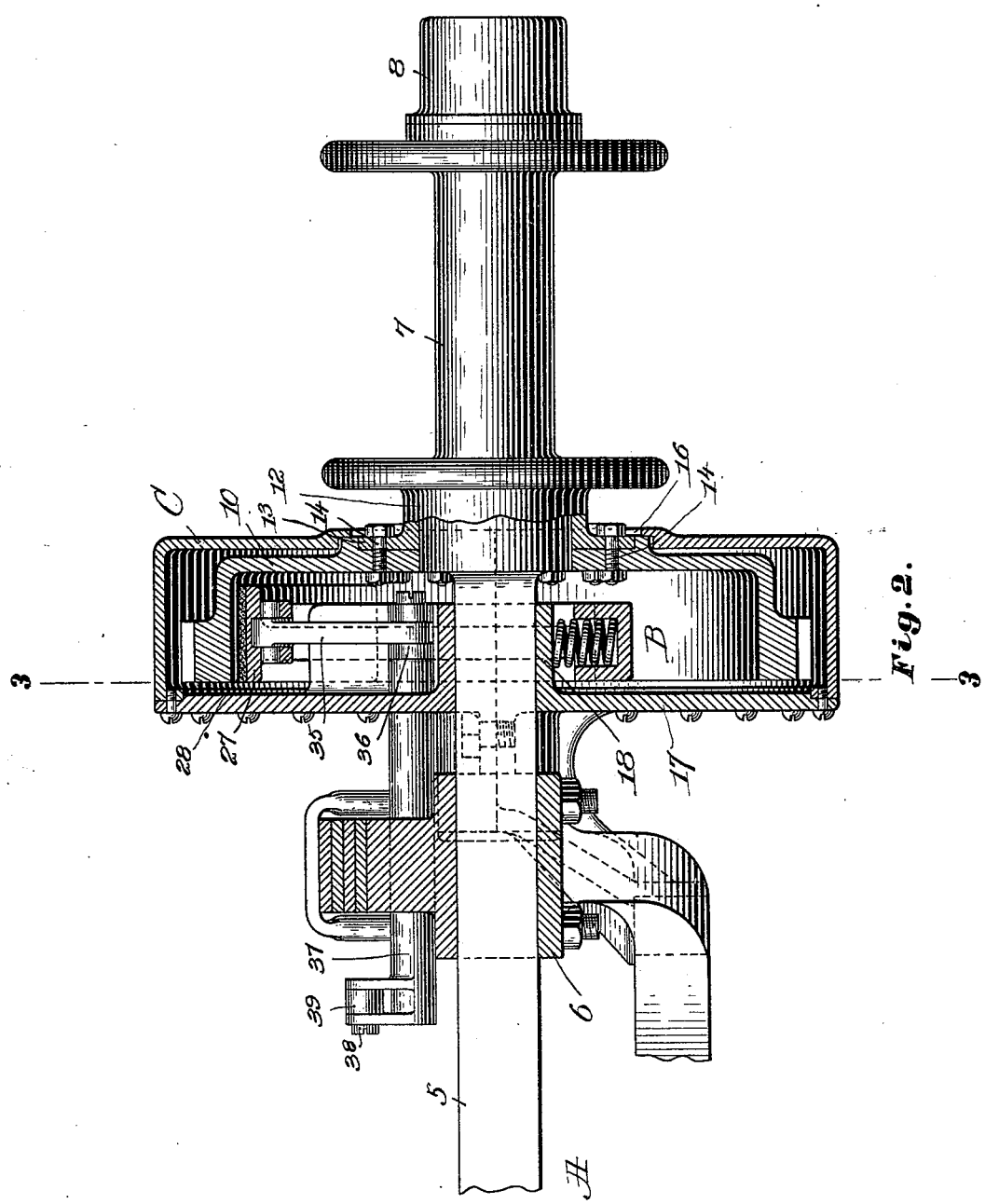
Figure 3:
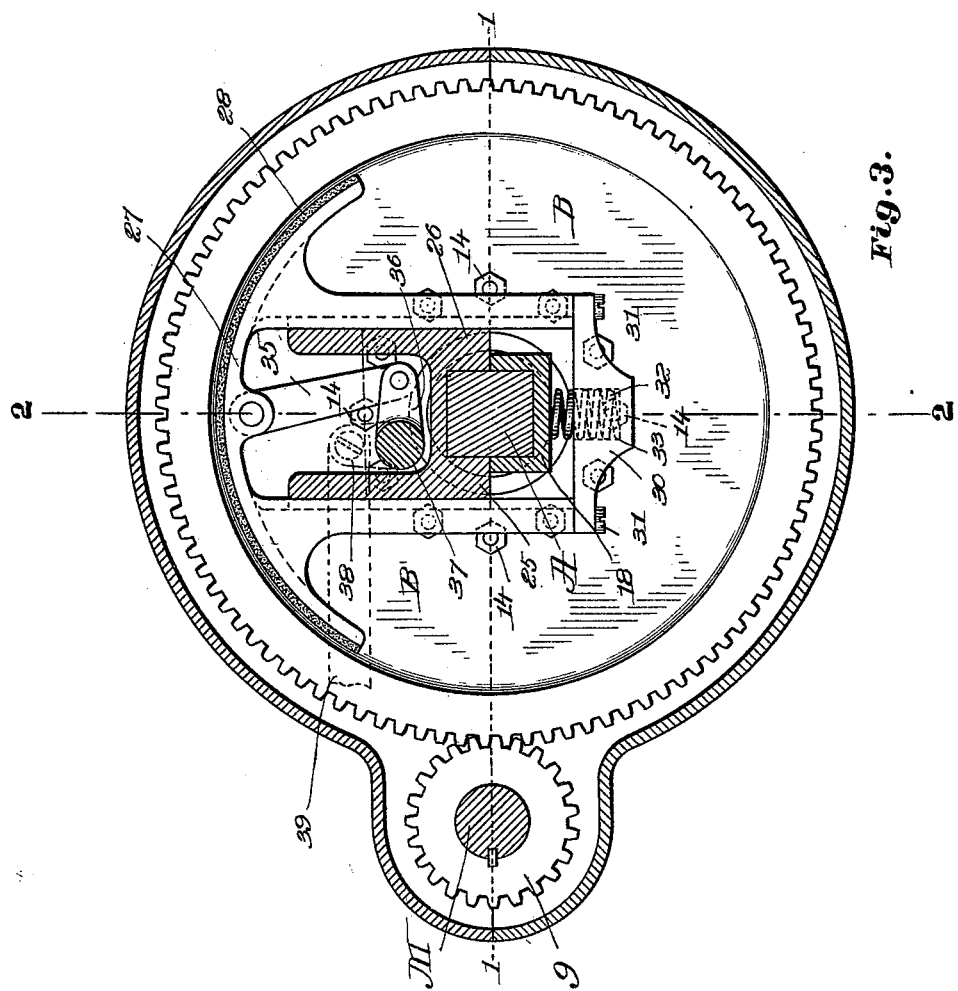

In the drawings, Figure 1 is a sectional plan view, the section being taken on the line 1 1, Fig. 3. Fig. 2 is a vertical central section, the section being taken on the line 2 2, Fig. 3; and Fig. 3 is a vertical section taken on the line 3 3, Fig. 2.

The brake constituting the subject-matter of the present application is adapted for application to various kinds of vehicles, and I have shown the same in the preferred embodiment thereof as connected with an automobile or motor-cycle, a fragment only, however, of the same being shown.

The axle of the vehicle is denoted by A, and it has the squared portion 5 projected through an opening in the framing or body 6. Said axle may be of any suitable type, and it is shown as carrying the hub 7 of a wheel which in the present case is connected by a train of intermeshing gears with a power or driving shaft, the latter being operated by some convenient type of motor mounted upon the vehicle. The hub 7 is internally threaded at its outer end to receive the externally-threaded cap 8, which receives the usual holding and check nuts on the threaded or bearing end of the axle A.

The power or motor shaft is denoted by M, and it is provided with a pinion 9, meshing with the large and hollow gear 10, both gears being inclosed by the casing or housing C and the gear 10 being directly connected with the hub 7 of the wheel, so that on operation of the motor-shaft the wheel will also be driven to propel the vehicle.

While I have represented a motor-shaft M as a means for propelling the vehicle or carriage and have shown intermeshing gears 9 and 10 for the purpose of imparting the necessary power from the driving-shaft to the wheel, it is evident that these parts can be varied, the driving-shaft being capable of operation by hand, and other elements can likewise be substituted for the intermeshing gears, and in some cases the driving element can be carried directly by the axis or shaft.

The driving member 10, which is connected with the wheel, is hollow, and the hub 7 has an inward annular projection 12, having the perpendicular flange 13, through which the fastening-bolts 14 extend, said bolts also passing through the web or body of the hollow peripherally-toothed gear 10, and it will be understood that by this connection between the wheel and the gear 10 the wheel will be rotated on the movement of the power-shaft M.

The intermeshing gears 9 and 10, as well as the brake mechanism, are disposed within the casing C, the body of which is substantially cylindrical and having an offset portion 15 to receive the pinion 9, while said body has a central aperture or hole 16, through which the hub 7 or, more correctly, the projection 12 thereof extends.

The back plate 17 of the casing or housing has near its center the inwardly-extending squared sleeve 18 to receive the correspondingly-shaped portion of the axle A, and said back plate 17 is provided with a flange 19, bolted or otherwise clamped to the body 6 of the vehicle.

The brake proper is denoted by B, and it involves in its construction a slide 25, involving two substantially-similar side arms having grooves to receive tongues on the guide 26, and provided with a shoe 27, adapted to act against the inner face of the hollow or chambered gear 10, a suitable friction device, as the strip 28 of leather, being secured to the curved inner face of the segmental shoe 27 and being adapted to bear directly against the corresponding curved surface of the said gear. The shoe is thrown into contact with the gear through the intervention of suitable mechanism under the control of the operator, and it serves when the power is shut off to block the action of said gear, and consequently of the wheel 7, connected with said gear.

The guide or support 26 for the brake B is in the nature of a substantially U-shaped member or yoke and is fixed to the back plate 17 of the casing or housing C, the guide in the present case being conveniently formed integral with the back plate.

The substantially-duplicate arms of the slide 25 are connected by means of the bar 30, which is secured to said arms by suitable fastening devices, as the screws 31, seated in the lower ends of said arms.

Normally the brake-shoe or the friction pad or strap 28, secured to the working face thereof, is held out of contact with the adjacent or contiguous surface of the hollow gear 10, and for this purpose any convenient instrumentality may be provided, the coiled spring 32 constituting a convenient and simple device for holding said brake in its ineffective or idle position. The spring 32 is seated in a socket 33, formed intermediate the ends of the connecting-bar 30, and bears against the under side of the squared sleeve 18 upon the back plate 17, and the action of the spring is such as to hold the shoe 27 away from the co-operating face of the gear 10.

Any suitable mechanism can be provided for forcing the brake-shoe 27 into working position, whereby the frictional pad 28 thereon can engage the gear 10, and for this purpose I have represented what is in the nature of a toggle mechanism, and in the embodiment herein illustrated it consists of a link 35 and a crank-arm 36, pivoted thereto, the link being joined to the under side of the brake-shoe 27 substantially intermediate the ends of said shoe. The crank-arm 36 is carried by the rock-shaft 37, suitably journaled upon the framing or body of the vehicle and having at its opposite end a second crank-arm 38, to which the link 39 is pivoted, said link being connected to an operating-lever (not shown) mounted upon the vehicle within reach of the operator.

In Fig. 3 the brake is represented as occupying its ineffective position and is thus held by the coiled protractile spring 32. When the link 39 is pulled to what is shown as the "left" in Fig. 3, the link 35, connected thereto, will be forced upward, thereby moving the brake against the adjacent face of the gear 10 to stop the rotation of the same, and consequently of the wheel connected with said gear, it being understood, of course, that prior to this operation the power will have been shut off.

Having fully described my invention, what I claim, and desire to secure by Letters Patent, is—

1. An appliance of the class specified, comprising a fixed axle, driving and driven members, the driven member being rotative on said axle, a wheel also rotatively supported on the axle and connected to said driven member, a casing surrounding said driving and driven members, a slide having a brake for one of said last-mentioned members and a guide for said slide fixed to said casing.

2. An appliance of the class specified, comprising a fixed axle, driving and driven members, the driven member being rotative on said axle, a wheel also rotative on said axle and connected to said driven member, a casing surrounding the driving and driven members, a yoke-shaped guide supported by the casing, a slide having two arms mounted for movement upon the respective branches of said guide and connected by a cross-bar and provided with a brake-shoe adapted to act against said driven member, a shaft disposed between the branches of the guide, connections between the shaft and the brake-shoe for operating the latter, and a spring bearing against said cross-bar, to hold the brake-shoe normally in its ineffective position.

3. An appliance of the class specified, comprising a power-shaft provided with a driving member, a hollow driven member operable by the driving member, a casing surrounding the driving and the driven members and adapted to exclude dust from the same, a brake disposed within the hollow driven member and adapted to engage the inner surface thereof, and means for operating said brake.

4. An appliance of the class specified, comprising a power-shaft, a driven member connected therewith, a guide, a slide mounted upon the guide and provided with a brake-shoe, means adapted normally to hold the brake-shoe out of contact with the driven member, and means including a toggle, located to force the brake-shoe into contact with the said driven member.

5. An appliance of the class specified, comprising a power-shaft, a hollow driven member connected therewith, a guide, a slide supported by the guide, a spring active against the slide, a brake-shoe connected with the slide, a shaft having a crank-arm, means for operating said shaft, and a link jointed respectively to the crank-arm and to the brake-shoe.

6. An appliance of the class specified, comprising a power-shaft, having a gear, a hollow gear meshing with the first-mentioned gear, a casing inclosing both gears, a brake located in the said hollow gear, and adapted to engage and block the operation of the same, means serving to hold the brake normally in its ineffective position, and mechanism operable in opposition to said last-mentioned means and serving to throw the brake into engagement with the hollow gear.

In testimony whereof I have signed my name to this specification in the presence of two subscribing witnesses.

PERRY D. BLACKDEN.

Witnesses:
HEATH SUTHERLAND,
JOHN C. EDWARDS.